Sept. 15, 1931.  F. H. CATHEY  1,823,529
DISK ATTACHMENT FOR WALKING CULTIVATORS
Filed July 20, 1929  3 Sheets-Sheet 1

Sept. 15, 1931. F. H. CATHEY 1,823,529
DISK ATTACHMENT FOR WALKING CULTIVATORS
Filed July 20, 1929 3 Sheets-Sheet 3

Inventor,
Frank H. Cathey

Patented Sept. 15, 1931

1,823,529

UNITED STATES PATENT OFFICE

FRANK H. CATHEY, OF DALLAS, TEXAS, ASSIGNOR TO ROCK ISLAND PLOW COMPANY, OF ROCK ISLAND, ILLINOIS, A CORPORATION OF ILLINOIS

DISK ATTACHMENT FOR WALKING CULTIVATORS

Application filed July 20, 1929. Serial No. 379,664.

This invention relates to improvements to disk attachments for walking cultivators of the shovel type, and has for its principal object to provide an improved form of shovel gang cultivator capable of being readily converted into a disk cultivator, or vice versa. A further object of the invention is to provide an improved form of detachable disk-carrying bracket including angle-adjusting means for the disks, which bracket may be bodily mounted on the gangs of a standard cultivator to replace the shovels thereon. Other features of invention will appear from time to time as the following description proceeds.

The invention may best be understood from the accompanying drawings, in which

Figure 1:
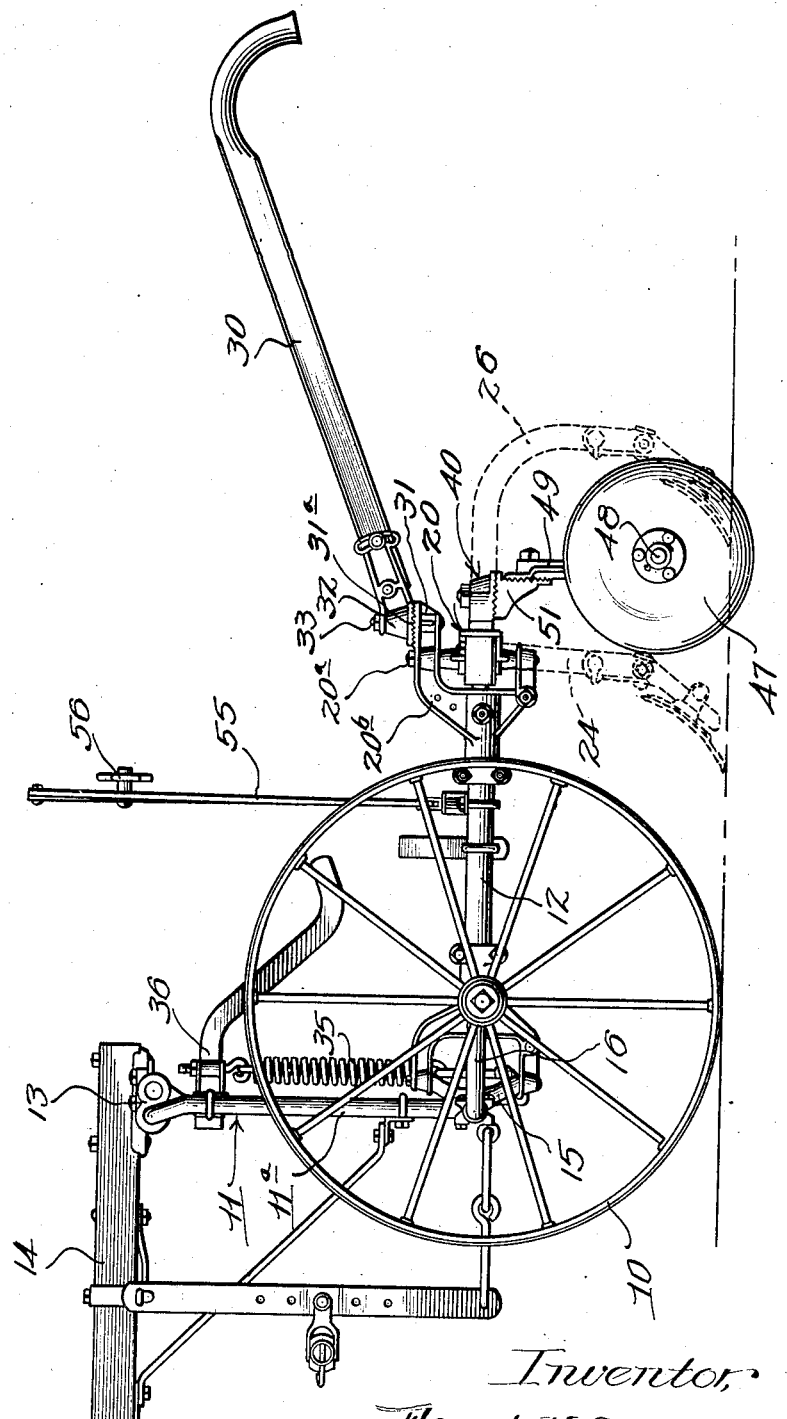
Figure 1 is a view in side elevation of a cultivator to which my invention has been applied.

Referring now to details of the drawings, my invention is shown as applied to a walking cultivator of a well-known type, having as its main parts a pair of ground wheels 10, 10, connected at opposite sides of a central arch 11, and a pair of gangs 12, 12, pivoted at the lower ends of the arch and extending rearwardly therefrom. In the form shown, the central arch consists of two vertically extending bars 11a, 11a, having their upper ends curved inwardly and adjustable laterally in a central bracket 13 on which is mounted the rear end of the tongue 14. The gangs 12, 12, are each pivotally mounted on a casting 15 at the lower end of their respective arch bars 11a, said castings also forming a support for the inner ends of the axles 16, 16, of the ground wheels 10, 10.

The cultivating tools are usually supported in a gang head 20 pivoted on an upright pin 20a in yoke 20b mounted on the rear end of each of the gangs 12. As the two gang heads are similar in construction, a description of one will suffice for the understanding of both. Said gang heads comprise a transversely extending bar 21 having one or more vertically extending apertures 22 at its inner end (herein as usually provided two such apertures are shown) for the insertion of a vertically extending shovel support 24, indicated in dotted lines in Figure 2. A somewhat similar set of apertures 25, 25, are provided at the opposite end of the gang head bar, but extending horizontally therethrough, for insertion of a horizontal shovel support 26, usually offset rearwardly of the shovel 24. It will be understood that the shovels 24 and 26 may be adjusted as usual to various widths by fitting them in one or the other of their respective apertures.

The securing means for the shovel supports consist of wedge bolts 27, 27, fitting in suitable apertures 27a extending transversely along one side of each of the apertures 22 and 25. Said wedge bolts are also used to secure the disk bracket in the gang head, as will hereafter more fully appear.

Each of the gangs are also provided with a handle 30 extending rearwardly in position to be operated by the driver. In the form shown, the gang has connection with each of said handles, to permit pivotal adjustment at varying angles thereto, said connection consisting of an extension 31 on yoke 20b having a toothed surface 31a engaged by a similar toothed surface 32a on the handle mounting 32. The parts are clamped together by a pivot pin 33, and are adjustable in the usual manner by loosening the latter.

Figure 2:
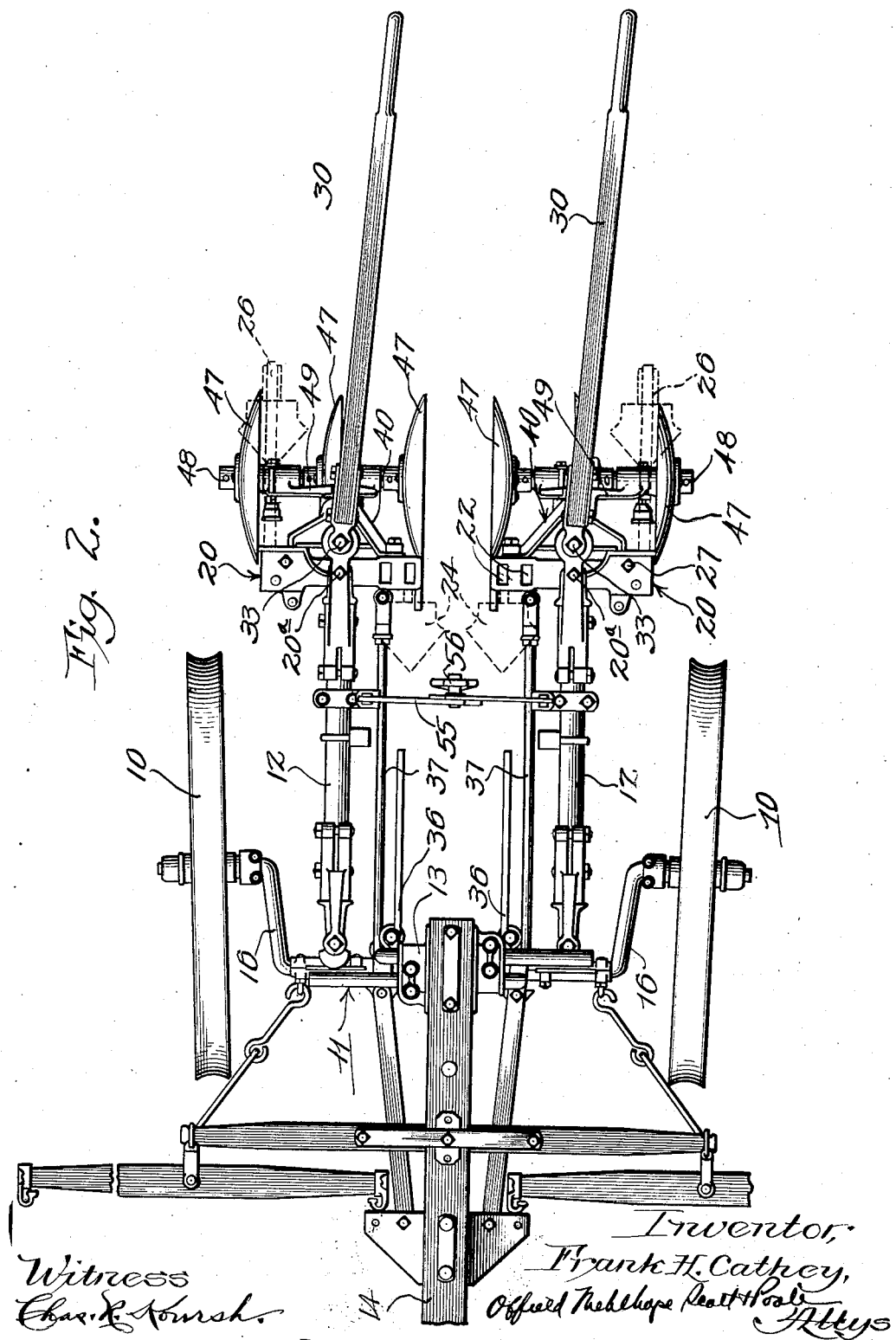
Figure 2 is a top plan view of the cultivator shown in Figure 1.

The cultivator shown herein also includes tension lifting means for the gangs, consisting of springs 35, 35, each connected between brackets 36, 36, carried near the upper part of the arch, and an intermediate point of horizontal bars 37, 37, each of which extends parallel with one of the gangs, (see Figure 2)

and is pivotally connected to its respective gang head so as to swing horizontally therewith, and maintain the two gang heads in parallel relation with each other.

Figure 4:
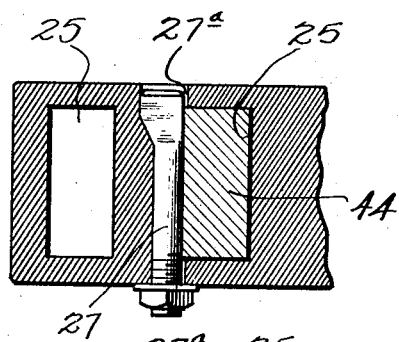
Figures 4 and 5 are enlarged sectional views taken vertically and horizontally, respectively through the left end of the gang head shown in Figure 3, to show the means of securing one end of the disk bracket therein.
Figure 5:
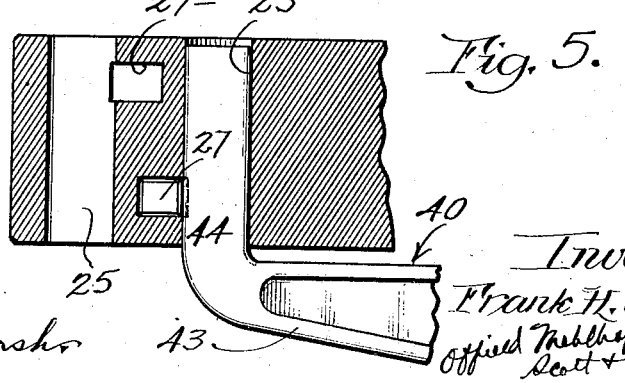

Referring now more particularly to the subject matter of the present invention, it will be seen that I provide a disk attachment which may be mounted on each of the gang heads in place of the usual shovels 24 and 26 to change the implement into a disk cultivator. This attachment consists of a bracket 40, having an inwardly extending arm 41 detachably connected to the cross arm 21 of gang head 20 by means of a bolt 42, which may for convenience, pass through one of the wedge bolt holes 27a therein, and an outwardly extending arm 43 having an inwardly curved end 44 which fits in one of the apertures 25 ordinarily provided in said cross bar for the shovel 26. The bracket end 44 is secured therein by the same wedge bolt 27 which is otherwise used for said shovel, as shown in Figures 4 and 5.

Figure 3:
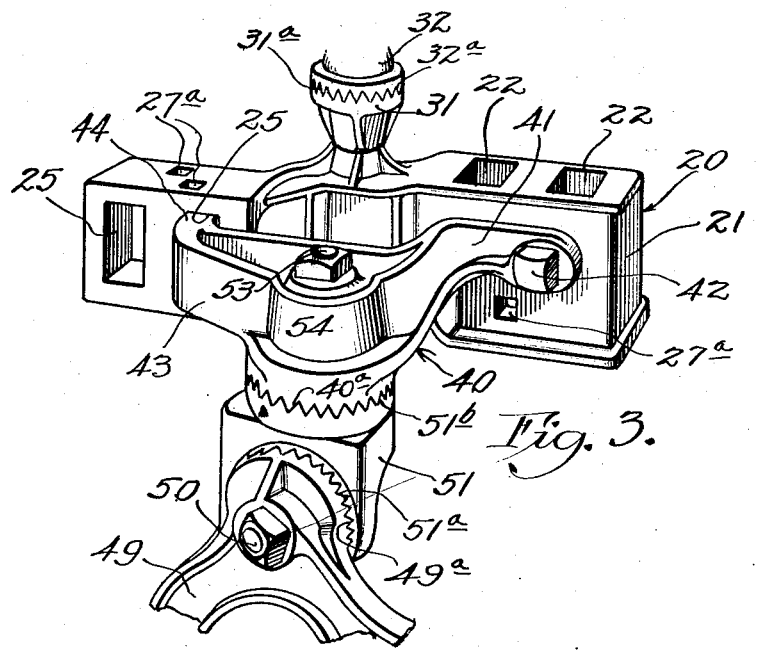
Figure 3 is a detail perspective view showing one of the gang heads at the rear end of the cultivator gangs, with the shovels removed, and replaced by my improved form of disk carrying bracket.

The disks 47, carried by each bracket (herein three in number) are mounted on a shaft 48, having bearing in a yoke 49 straddling the center disk, as shown in Figure 2. The upper end of the yoke has connections permitting adjustments on both horizontal and vertical axes relative to the gang head. As best shown in Figure 3, said connections include a horizontal pivot pin 50 connecting the yoke 49 with an intermediate piece 51, said yoke and intermediate piece having cooperating toothed or serrated surfaces 49a and 51a respectively, so as to be rigidly held in adjusted position when clamped by the pivot pin 50. The intermediate piece 51 has a similar pivotally adjustable connection with the bracket 40, but permitting swivelling action in a horizontal plane, said connection consisting of a vertically disposed pivot pin 53 extending through said intermediate piece and a boss 54 on said bracket. The two horizontally swivelling parts are similarly provided with toothed engaging surfaces 40a and 51b.

In order to take the side thrust on the gangs 12, 12, and maintain them in proper spaced relation, I also provide an adjustable arch member 55, connecting the two gangs intermediate their ends as shown, and including an adjustable pivot connection 56 of the form well known in the art.

With the construction described, the disk devices may be attached directly to the gang heads of standard construction, replacing the shovels thereon. The disks are disposed below the bracket and gang head so that they may be swivelled at any angle relative thereto, and may be reversed end to end so as to turn the dirt either inwardly or outwardly. The disks may also be adjusted horizontally as required.

Although I have illustrated and described the particular embodiment of my invention, it will be understood that I do not wish to be limited to the exact construction shown and described, but that various changes and modifications may be made without departing from the spirit and scope of my invention.

I claim as my invention:

1. In a cultivator a frame, a par of gangs pivoted on said frame and extending rearwardly therefrom, gang heads pivoted on said gangs, a bar pivotally connected between each of said gang heads, and said frame to maintain said gang heads in parallel relation, a disk shaft having a plurality of disks thereon pivotally adjustable on horizontal axes relative to each of said gang heads, and an arch adjustably connecting said gangs adjacent their ends to take the side thrust of said disks and maintain them in predetermined spaced relation.

2. In a cultivator, a frame, a pair of gangs pivoted on said frame and extending rearwardly therefrom, gang heads pivoted on said gangs, a bar pivotally connected between each of said gang heads and said frame to maintain said gang heads in parallel relation, a disk shaft having a plurality of disks thereon pivotally adjustable on horizontal axes relative to each of said gang heads, a rearwardly extending handle pivotally connected to each of said gang heads, and an arch adjustably connecting said gangs adjacent their ends to take the side thrust of said disks and maintain them in predetermined spaced relation.

Signed at Dallas, Texas, this 15th day of July, 1929.

FRANK H. CATHEY.